(12) United States Patent
Krieg

(10) Patent No.: US 10,971,941 B2
(45) Date of Patent: Apr. 6, 2021

(54) CHARGING CIRCUIT AND CHARGING METHOD FOR AN ELECTRICAL ENERGY STORAGE SYSTEM

(71) Applicant: Robert Bosch GmbH, Stuttgart (DE)

(72) Inventor: Berengar Krieg, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 383 days.

(21) Appl. No.: 16/063,678

(22) PCT Filed: Dec. 6, 2016

(86) PCT No.: PCT/EP2016/079804
§ 371 (c)(1),
(2) Date: Jun. 18, 2018

(87) PCT Pub. No.: WO2017/102414
PCT Pub. Date: Jun. 22, 2017

(65) Prior Publication Data
US 2020/0274370 A1    Aug. 27, 2020

(30) Foreign Application Priority Data

Dec. 18, 2015 (DE) .......................... 102015225850.5
Nov. 25, 2016 (DE) .......................... 102016223470.6

(51) Int. Cl.
*H02J 7/00* (2006.01)
*B60K 6/28* (2007.10)
*B60L 53/122* (2019.01)

(52) U.S. Cl.
CPC .......... *H02J 7/0024* (2013.01); *B60L 53/122* (2019.02); *H02J 7/0048* (2020.01); *B60K 6/28* (2013.01);
(Continued)

(58) Field of Classification Search
CPC ..... H02J 7/0024; H02J 7/0048; B60L 53/122; B60K 6/28; B60Y 2200/91; B60Y 2200/92; B60Y 2300/91
(Continued)

(56) References Cited

U.S. PATENT DOCUMENTS 5,274,272 A  * 12/1993  Schwarzinger ......... H02J 7/022
                                                            327/543
6,346,794 B1   2/2002   Odaohhara
(Continued)

FOREIGN PATENT DOCUMENTS

CN        104617634 A       5/2015
DE        10055531 A1       1/2002
(Continued)

OTHER PUBLICATIONS

International Search Report with English translation and Written Opinion for Application No. PCT/EP2016/079804 dated Jan. 31, 2017 (13 pages).

*Primary Examiner* — M Baye Diao
(74) *Attorney, Agent, or Firm* — Michael Best & Friedrich LLP

(57) ABSTRACT

A charging circuit for an electrical energy storage system having electrical energy storage units. The charging circuit includes a first input and a second input for electrically connecting to an energy source, a first output and a second output, and first pole connections and second pole connections. The pole connections are connected in an electrically conductive manner to corresponding pole connections of the electrical energy storage units. In addition, the charging circuit includes first switches, second switches, and third switches.

17 Claims, 8 Drawing Sheets

(52) U.S. Cl.
CPC ....... *B60Y 2200/91* (2013.01); *B60Y 2200/92* (2013.01); *B60Y 2300/91* (2013.01)

(58) Field of Classification Search
USPC ........................................................ 320/109
See application file for complete search history.

(56) References Cited

U.S. PATENT DOCUMENTS

| | | | |
|---|---|---|---|
| 6,469,498 B1 * | 10/2002 | Steinich | G01B 7/003 |
| | | | 324/207.13 |
| 8,698,452 B2 * | 4/2014 | Scheucher | H01M 2/1077 |
| | | | 320/109 |
| 8,796,987 B2 * | 8/2014 | Scheucher | B60L 53/11 |
| | | | 320/104 |
| 9,125,462 B2 * | 9/2015 | Akin | H02J 7/025 |
| 10,218,189 B2 * | 2/2019 | Goetz | H02M 1/32 |
| 2005/0007074 A1 | 1/2005 | Koster et al. | |
| 2005/0052154 A1 | 3/2005 | Kavounas | |
| 2006/0092583 A1 | 5/2006 | Alahmad et al. | |
| 2007/0139012 A1 | 6/2007 | Hayashigawa | |
| 2013/0106357 A1 | 5/2013 | Girard et al. | |
| 2013/0175864 A1 | 7/2013 | Pan et al. | |
| 2013/0342151 A1 | 12/2013 | Kurokawa et al. | |
| 2014/0152262 A1 | 6/2014 | Nomoto | |

FOREIGN PATENT DOCUMENTS

| | | |
|---|---|---|
| EP | 1562252 A1 | 8/2005 |
| JP | H11234909 A | 8/1999 |
| JP | 2008278635 A | 11/2008 |
| TW | 201126864 A | 8/2011 |
| WO | 2008155209 A1 | 12/2008 |
| WO | 2014156390 A1 | 10/2014 |

* cited by examiner

CHARGING CIRCUIT AND CHARGING METHOD FOR AN ELECTRICAL ENERGY STORAGE SYSTEM

BACKGROUND OF THE INVENTION

The present invention is based on a charging circuit for an electrical energy storage system and a charging method for the charging operation of an electrical energy storage system in accordance with the preamble of the independent patent claims.

The charging of electrically driven vehicles, in particular of vehicles with a battery as the main energy source, is currently the subject of intensive research and development. Firstly, this is due to the fact that current charging times for a full battery charge are still very long, and secondly, the capacity of future energy stores will likely increase further, so that in the near future electrical energy storage systems fitted to the vehicle will have capacities of more than 50 kWh. At the same time, for a wider acceptance of these vehicles shorter charging times are desirable, ideally comparable to the time required for refueling vehicles with internal combustion engines.

Due to technical standards, existing components and technologies and efficiency requirements, a normal operating voltage of the vehicle power train is currently limited to values from typically 300 V to 450 V for purely electrically powered vehicles. Standards-compliant charging connectors are typically certified for rated currents up to 200 A, wherein the charging voltage for DC voltage charging can be typically between 200 V and 850 V. By means of communication between the energy storage system and the charging device, a smooth regulation of charging voltage and charging current is possible on the charging device side within certain limits.

However, electrical energy storage systems available today, in particular battery systems, do not offer any means to increase the voltage during charging, since their interconnection is hard-wired, for example in series or parallel circuits, while at the same time continuing to operate the existing components on the drive side, for example the inverter, at the normal operating voltage level. An example of a circuit arrangement in accordance with the prior art is shown in FIG. 1.

In document JP 2012-065435 a DC/DC converter is described, which by means of a plurality of capacitors, can output an increased output voltage compared to the connected batteries.

The document US 2013/0175865 A1 describes a charging/discharging system for batteries, wherein a connected electrical consumer is subject to an increased voltage.

Document US 2013/0106357 A1 discloses a battery pack for an electric vehicle, in which individual batteries of the battery pack can be controlled using semiconductor switches.

Document US 2005/0052154 A1 describes a medical device with a switch arrangement, the discharge voltage of which is higher than its charging voltage.

In document US 2007/0139012 A1 a fast charging system and a fast charging method are described.

SUMMARY OF THE INVENTION

The invention provides a charging circuit for an electrical energy storage system, a charging method for the charging operation of an electrical energy storage system and an electrical energy storage system.

The charging circuit for an electrical energy storage system, which has n electrical energy storage units, each with a first pole and a second pole, comprises at least one first input and one second input for electrically connecting to an energy source, at least one output and one second output for electrically connecting to an electrical component, at least n first pole connections and n second pole connections, wherein an i-th first pole connection and an i-th second pole connection can be connected in an electrically conductive manner to the first pole of the i-th electrical energy storage unit and to the second pole of the i-th electrical energy storage unit respectively. In addition, the charging circuit has at least n first switches, wherein a first connection of the i-th first switch is connected in an electrically conductive manner to the i-th first pole connection of the i-th electrical energy storage unit. The charging circuit also comprises at least n second switches, wherein a first connection of the i-th second switch is connected in an electrically conductive manner to the i-th second pole connection of the i-th electrical energy storage unit, and also comprises at least n−1 third switches, wherein a first connection of the k-th third switch and a second connection of the k-th third switch are connected in an electrically conductive manner to the first pole connection of the k-th electrical energy storage unit and to the second pole connection of the k+1-th electrical energy storage unit respectively, where n>1 and i<=n and k<n are natural numbers. According to the invention in addition, the first output is connected in an electrically conductive manner to the second connection of the first switch, the second output is connected in an electrically conductive manner to the second connection of the first second switch, the first input is connected in an electrically conductive manner to the first connection of the n-th first switch and the second input is connected in an electrically conductive manner to the first connection of the first second switch. According to the invention the first switches, the second switches and the third switches are also connected in such a way that, by means of an energy source connected to the first input and the second input, a voltage level at least twice as high as the voltage level between the first output and the second output is applied between the first input and the second input during the charging operation. This type of interconnection has the advantage that due to the increased voltage level in the charging mode, the charging power can be at least doubled, resulting in substantially shorter charging times. At the same time, existing electrical components on the output side, for example, the inverter, can continue to be operated at the normal operating voltage level, so that no new development or use of new technologies is required for these components. As part of the fluctuations of the characteristic parameters of the electrical energy storage unit, for example its internal resistance and capacitance, the increased voltage level in the charging mode may vary slightly.

The energy source is preferably a direct current (DC) power source.

The switches can be implemented, for example, as semiconductor switches, such as MOSFETs or IGBTs, or also as electro-mechanical relays or contactors.

The charging circuit is preferably designed in such a way that the second connection of the i-th second switch is connected in an electrically conductive manner to the second output and the second connection of the i-th first switch is connected to the first output in an electrically conductive manner. This can involve any number of electrical energy storage units connected in parallel with each other. Thus, a greater energy storage capacity is available to any electrical component connected to the first output and the second output. Furthermore, for example, the electrical component can be supplied by the energy storage unit that has the highest state of charge.

Advantageously, the charging circuit comprises at least n−1 fourth switches, wherein the k-th fourth switch is inserted into the electrical connection between the second connection of the k-th third switch and the second pole connection of the k+1-th electrical energy storage unit, and the second connection of the k-th third switch is connected in an electrically conductive manner to a first connection of the k-th fourth switch and a second connection of the k-th fourth switch is connected in an electrically conductive manner to the second pole connection of the k+1-th electrical energy storage unit. As a result, with separately fitted, possibly sealed electrical energy storage units, for example two battery modules, the electrical conductor which produces the series circuit can be isolated from the potential of all poles of the electrical energy storage units, which is a requirement in the automotive sector.

In accordance with one design, for each two-element subset of the n-element set of the electrical energy storage units, which does not consist of neighboring elements, the charging circuit comprises at least one fifth switch. In this case the first connection of the respective fifth switch and a second connection of the respective fifth switch are connected in an electrically conductive manner to the first pole connection of the respective first electrical energy storage unit and the second pole connection of the respective second electrical energy storage unit respectively. This allows electrical energy storage units that are not directly adjacent to be also connected in series, which enables more flexible charging options to be achieved. For example, in the case of three electrical energy storage units 1, 2 and 3, the units 1 and 3 can be connected in series, in order to be charged with a higher charging voltage.

Advantageously, for each two-element subset of the n-element set of the electrical energy storage units, which does not consist of neighboring elements, the charging circuit comprises at least the fifth switch and at least one sixth switch. In this case, the first connection of the respective fifth switch and the second connection of the respective fifth switch are connected in an electrically conductive manner to the first pole connection of the respective first electrical energy storage unit and a first connection of the respective sixth switch respectively. In addition, a second connection of the respective sixth switch is connected in an electrically conductive manner to the second pole connection of the respective second electrical energy storage unit. This allows electrical energy storage units that are not directly adjacent to be also connected in series, which enables more flexible charging options to be achieved, and at the same time, increased security requirements to be satisfied, such as an all-pole potential isolation of the connecting conductors, which may be required in the case of separate housings.

According to a further design of the charging circuit, an inductive component, such as a coil, is connected in an electrically conductive manner in series with at least one first switch and/or at least one second switch.

As a result, a possible compensating current produced when forming a parallel connection between electrical energy storage units is better able to be limited.

In addition, the subject matter of the invention also relates to a charging method for the charging operation of an electrical energy storage system, wherein the electrical energy storage system has at least two electrical energy storage units and at least one charging circuit according to the invention. In a first step, the method comprises a selection of at least two of the n electrical energy storage units, which are to be charged in the charging operation by means of an energy source connected to the first input and the second input, and deciding whether an electrical component connected to the first output and the second output should be supplied during the charging of at least one electrical energy storage unit. The connected component can be supplied both by electrical energy storage units that are to be charged, as well as by those which are not to be charged. Where appropriate, the electrical component can also be supplied by none of the electrical energy storage units. In a following step the first switches and the second switches of the electrical energy storage unit to be charged are then opened, wherein depending on the decision taken in the first step, those first switches and second switches which belong to the at least one electrical energy storage unit supplying the electrical component are closed. If it has been decided that the electrical component should be supplied with energy during the charging operation of at least one electrical energy storage unit, then those first switches and second switches that belong to the appropriate electrical energy storage units are not opened. In a third step, the third switches that connect the electrical energy storage units to be charged in series are closed. In a fourth step, the energy supply is started by means of an energy source connected to the first input and the second input. By means of these method steps, the charging voltage can be increased while at the same time the electrical component continues to be supplied with energy at its normal operating voltage level. Any matching of electrical components can thus be avoided.

In accordance with another aspect, it can be provided that in a fifth step, the closure takes place of those fourth switches that are connected in an electrically conductive manner to the third switches, which connect in series the electrical energy storage units to be charged. This allows an all-pole isolation from the electrical potential of the electrical energy storage units to be effected, which may be necessary in order to comply with safety requirements.

Advantageously, in a sixth step those fifth and sixth switches that connect the electrical energy storage units to be charged in series are closed. Thus, even non-adjacent electrical energy storage units can be charged with increased charging voltage.

A preferred configuration of the method also comprises a deactivation of the energy supply in a seventh step, opening of the switches that electrically connect the charged electrical energy storage units in series in an eighth step, and a closure of the first switches and the second switches of the charged electrical energy storage units in a ninth step. Therefore, a safe and reliable changeover to normal operation with normal operating voltage can be performed.

It is advantageous within the procedure if in the ninth step at least one switch is operated in a clocked mode for a defined time period, for example for a single-digit number of minutes. This allows high currents normally produced when making or restoring a parallel connection between at least two electrical energy storage units can be avoided, which, for example, can reduce an unwanted increase in temperature due to these currents.

Preferably within the method, the charging states of the individual electrical energy storage units are monitored, and upon exceeding a defined charge state difference between any two electrical energy storage units, an electrical component connected via the first output and the second output is supplied with energy by means of appropriate activation of at least the first, the second and the third switches by the electrical energy storage unit with the highest charge state. Where appropriate, the fourth, the fifth and the sixth switches are also activated. This enables a uniform charging of the electrical energy storage units, which is advantageous with regard to the aging behavior of the electrical energy storage units. Alternatively, criteria other than the charge state difference can also be used. For example, on the basis of exceeding a temperature difference between two or more electrical energy storage units, one or more electrical energy storage units can be specified, which supply the electrical component by means of a suitable activation of the switches. Alternatively, a state of health of the electrical energy storage units can also be used as a criterion, so that in the event of larger deviations in this parameter, the at least one electrical energy storage unit which is not yet as severely aged as the remainder of the electrical energy storage units of the system can be specifically selected to supply the electrical component. The state of health comprises, for example, an internal resistance value or a capacitance value of an electrical energy storage unit.

Advantageously, within the method, the electrical energy storage units are uniformly charged by the electrical energy storage units to be charged that were selected in the first step being exchanged on a cyclical basis. As a result, the energy content of the energy storage system can be maximized.

According to a further configuration of the method, depending on the decision taken in the first step as to whether an electric component connected to the first output and the second output is to be supplied with energy, the at least one electrical energy storage unit supplying the electrical component can be exchanged cyclically. This ensures a uniform loading of the electrical energy storage units and prevents excessive discharging of the at least one electrical energy storage unit supplying the electrical component.

The subject matter of the invention additionally relates to an electrical energy storage system with at least two electrical energy storage units, wherein the electrical energy storage system comprises a charging circuit according to the invention. Thus, in particular at the system level, a significant reduction of the charging time can be achieved while retaining the use of proven technologies.

The subject matter of the invention additionally relates to the use of a charging circuit in electrically powered vehicles, including hybrid vehicles.

An electrical energy storage unit may be understood to mean, in particular, an electro-chemical battery cell and/or a battery module with at least one electrochemical battery cell and/or a battery pack with at least one battery module. For example, the electrical energy storage unit can be a lithium battery cell or a lithium battery module or a lithium battery pack. In particular, the electrical energy storage unit can be a lithium-ion battery cell or a lithium-ion battery module or a lithium-ion battery pack. Furthermore, the type of the battery cell can be lithium-polymer rechargeable accumulator, nickel-metal-hydride accumulator, lead-acid accumulator, lithium-air accumulator or lithium-sulfur battery accumulator, or quite generally, an accumulator of any electrochemical composition.

BRIEF DESCRIPTION OF THE DRAWINGS

Shown are.

DETAILED DESCRIPTION

Figure 1:
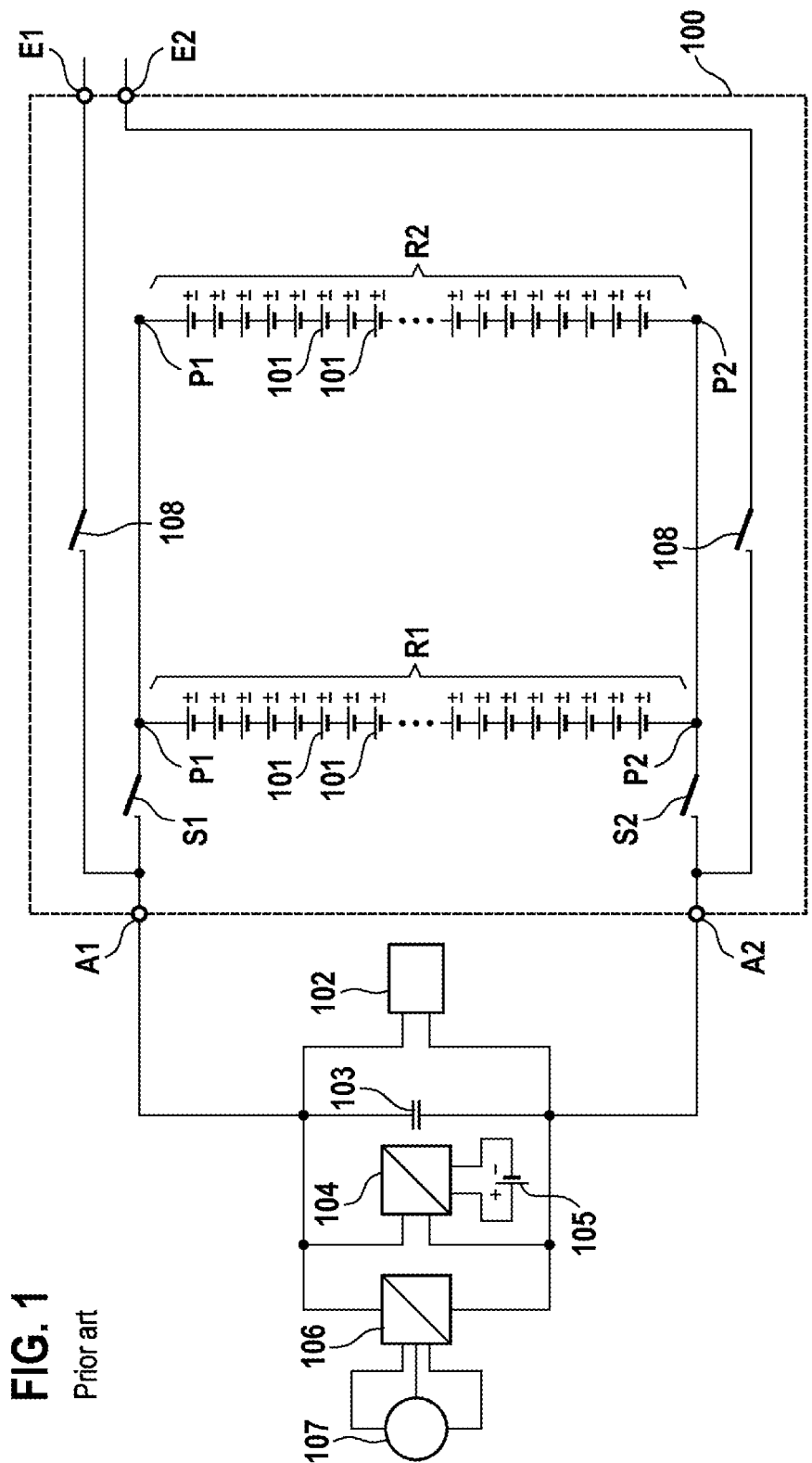
FIG. 1 a circuit arrangement of electrical energy storage units for a vehicle in accordance with the prior art, FIG. 2 a charging circuit according to the invention for a vehicle with two electrical energy storage units, according to a first embodiment, FIG. 3 a charging circuit according to the invention for a vehicle with two electrical energy storage units, according to a second embodiment, FIG. 4 a charging circuit according to the invention for a vehicle with two electrical energy storage units, according to a third embodiment, FIG. 5 a charging circuit according to the invention for a vehicle with three electrical energy storage units, according to a fourth embodiment, FIG. 6 a flow chart of a method according to the invention for an electrical energy storage system with three electrical energy storage units, in accordance with an exemplary embodiment, FIG. 7 a time curve of the charge state when the charging method according to the invention is used in accordance with the exemplary embodiment of an electrical energy storage system with three electrical energy storage units, and FIG. 8 a flow diagram of the method according to the invention in accordance with a second embodiment of an electrical energy storage system with two electrical energy storage units.

The same reference numerals refer to the same device components or method steps in all figures.

Figure 2:
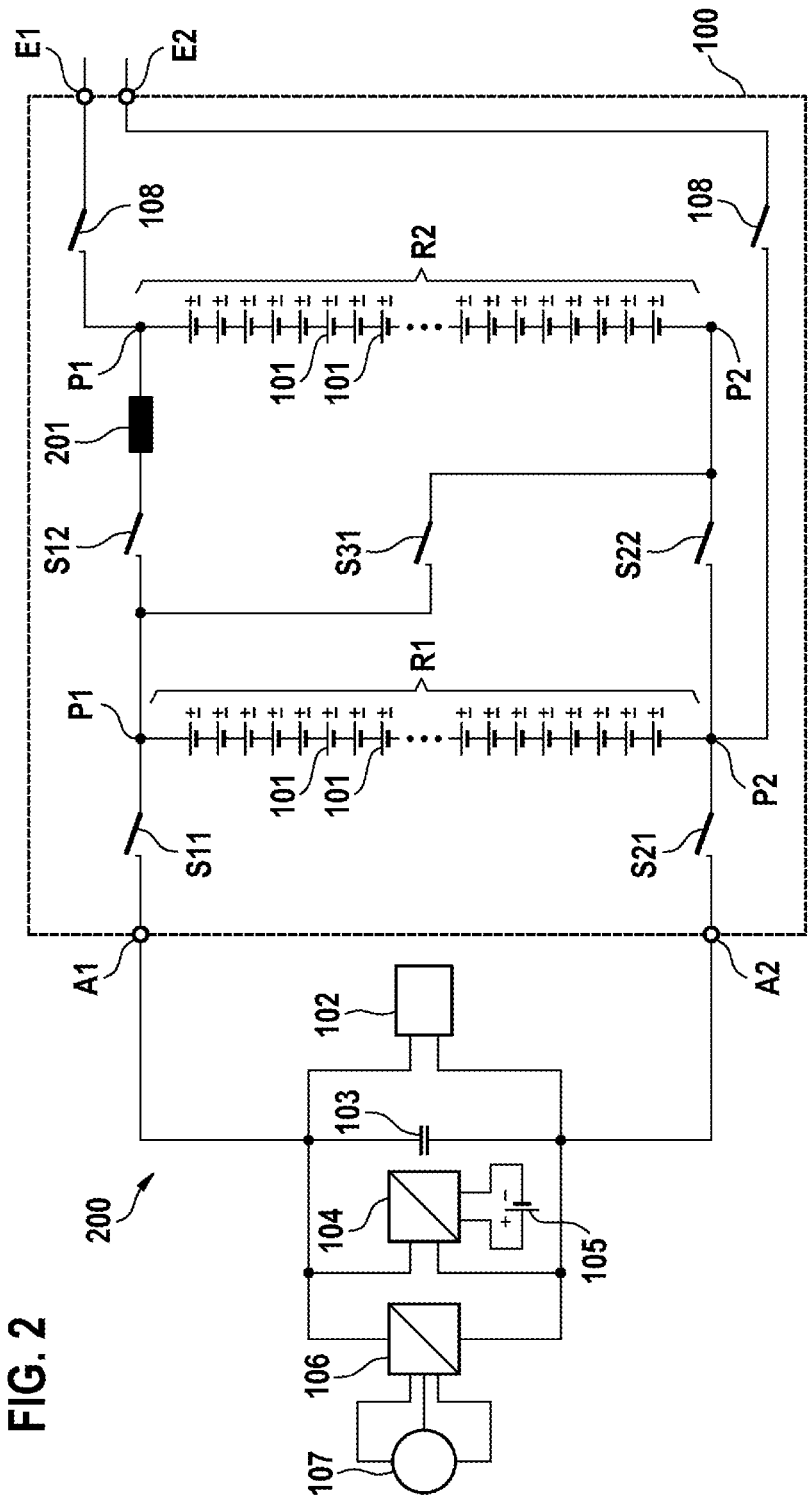

FIG. 2 shows a charging circuit 200 according to the invention for a vehicle with two electrical energy storage units R1 and R2 according to a first embodiment. In the left-hand area, electrical components are shown which can remain unchanged during the use of the charging circuit 200 according to the invention. In particular, these are an electric motor 107, an inverter 106, a DC/DC converter 104 for the 12-V on-board power supply and the on-board power supply battery 105, an intermediate circuit with an intermediate circuit capacitance 103, and an air conditioning compressor 102. All electrical components that are connected to the charging circuit 200 via the first output A1 and the second output A2 can therefore continue to be used unchanged. The electrical energy storage units R1 and R2 are connected inside the battery 100 via the two first pole connections P1 and the two second pole connections P2 to the charging circuit 200 according to the invention. The electrical energy storage units R1 and R2 consist of a plurality of individual battery cells 101. A first first switch S11 and a first second switch S21 are used, in particular, to enable an electrical connection of the first electrical energy storage unit R1 to the first output A1 or the second output A2 respectively. In addition, a second first switch S12 and a second second switch S22 are used, in particular, to enable an electrical connection of the second electrical energy storage unit R2 to the first output A1 or the second output A2 respectively. Furthermore, a first third switch S31 is used to interconnect the electrical energy storage units R1 and R2 in series with each other in the charging mode. Energy is supplied by means of an energy source connected to the first input E1 and the second input E2. Via two switches 108, the first input E1 and the second input E2 can be disconnected from the energy storage units. This ensures that the inputs can be switched to zero voltage when no charging is taking place. The switch positions of the first switches S11 and S12, the second switches S21 and S22 and the first third switches S31 and the switches 108 when connected in series in the charging mode are specified in the following table:

| | S11 | S12 | S21 | S22 | S31 | 108 |
|---|---|---|---|---|---|---|
| Switch position in charging mode | closed/open | open | closed/open | open | closed | closed |

In the charging mode therefore, twice the voltage is applied between the first input E1 and the second input E2, so that twice the amount of energy can be transferred for the same current. When producing the series circuit, care must be exercised to ensure that the second first switch S12 and the second second switch S22 are opened first before the first third switch S31 is closed, to avoid an electrical short circuit. In the case of mechanical switching devices such as contactors, this can be achieved by means of a common mechanical coupling of the second first switch S12, the second second switch S22 and the first third switch S31, with an appropriate delay in the opening of the first third switch S31, or in the case of electronic switching devices, such as MOSFETs or IGBTs, and with non-coupled electromechanical switching devices, by means of a suitable veto wiring of the control or by means of appropriately protected software functions in an electronic unit, not shown here, which controls the switching device. The first first switch S11 and the first second switch S21 can be in either the closed or open state, depending on whether one or more electrical components connected via the first output A1 and the second output A2 can also be supplied with energy during the charging operation. The supply of the connected electrical components 102 to 107 is useful, for example, in order to supply, for example, the cooling system of the battery 100 and any connected 12V consumers during the charging process. If the first first switch S11 and the first second switch S21 are closed, the electrical energy storage units R1 and R2 are charged to different levels. The first electrical energy storage unit R1 is charged by a lower charging current and therefore typically has a lower state of charge than the second electrical energy storage unit R2 at the end of the charging process.

If the charging operation has been terminated and energy is intended to be delivered to electrical components connected via the first output A1 and the second output A2, then the switch position of the given switches will change as follows:

| | S11 | S12 | S21 | S22 | S31 | 108 |
|---|---|---|---|---|---|---|
| Switch position in non-charging mode | closed | Closed | closed | closed | open | open |

When switching over from series connection of the electrical energy storage units R1 and R2 to parallel connection of R1 and R2, it should be ensured that the first third switch S31 is opened first before the second first switch S12 and the second second switch S22 are changed over, to avoid a short circuit. This can be effected with the above-mentioned means, for example a mechanical coupling.

In order to limit a possible compensation current when producing the parallel connection between the two electrical energy storage units, an additional, primarily inductively acting component 201 is included in the charging circuit 200. In addition, to limit the compensation current the second first switch S12 can be operated in a clocked mode for a certain length of time, for example several minutes.

Figure 3:
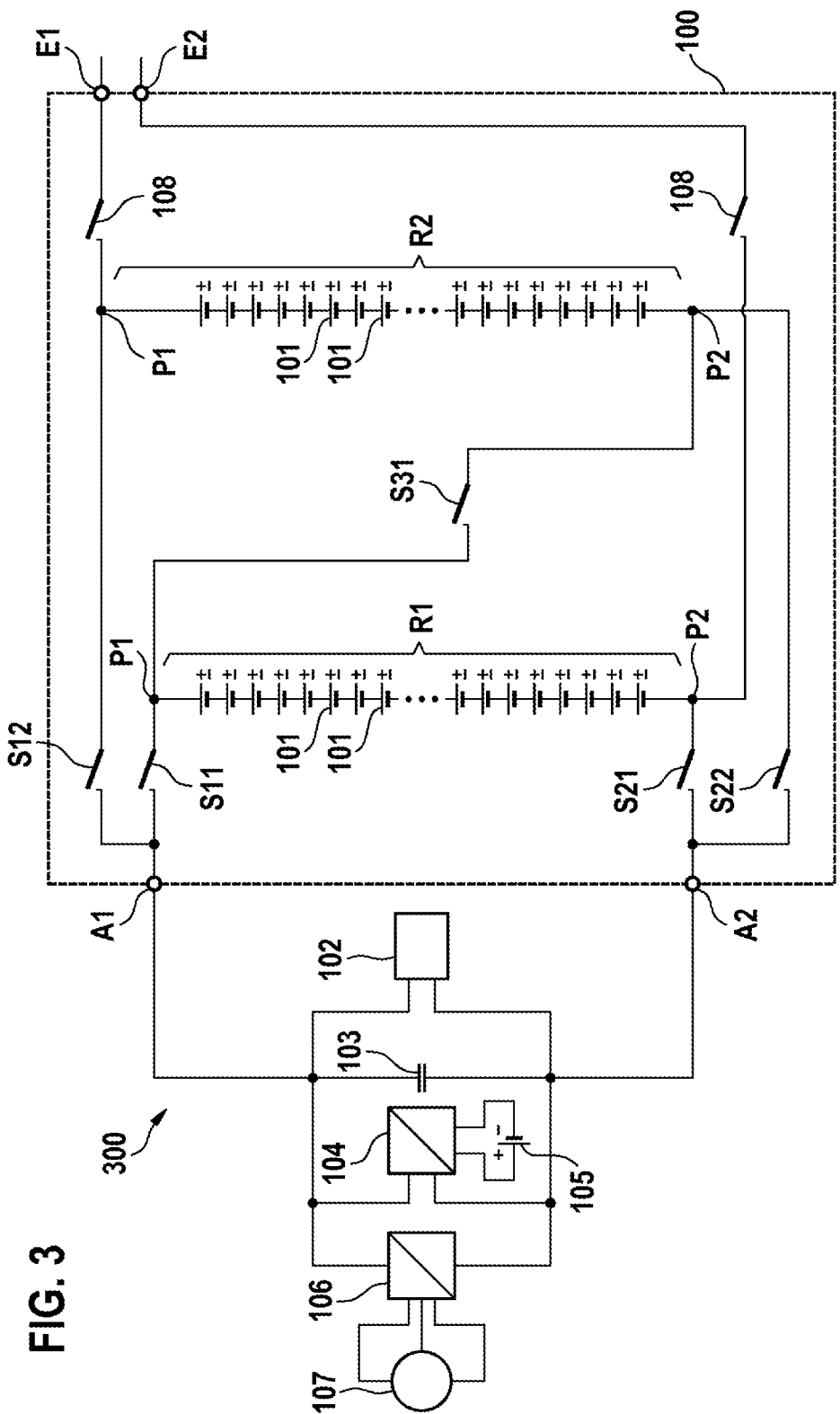

FIG. 3 shows a charging circuit 300 according to the invention for a vehicle with two electrical energy storage units R1 and R2 according to a second embodiment. In this case, electrical components connected via the first output A1 and the second output A2 can be supplied both by the first electrical energy storage unit R1 and by the second electrical energy storage unit R2 during the charging process. To this end, the second connections of the first switches S11 and S12 are each connected in an electrically conductive manner to the first output A1, and the second connections of the second switches S21 and S22 are each connected in an electrically conductive manner to the second output A2. This allows an alternating connection or disconnection of the electrical components connected via the first and second outputs A1 and A2 to or from the first electrical energy storage unit R1 or the second electrical energy storage unit R2. Thus, any uneven charging of the electrical energy storage units R1 and R2 will be limited. Furthermore, in the case of unequal states of charge, at first only the electrical energy storage unit with the higher charge state is used to supply the electrical components, by the corresponding first and second switches being opened or closed respectively. The switches 108 are used for the electrical isolation of the first input E1 and the second input E2 of voltage-carrying components, in this case the electrical energy storage units R1 and R2. This ensures that all terminals of the battery can be disconnected from the power supply 100.

Figure 4:
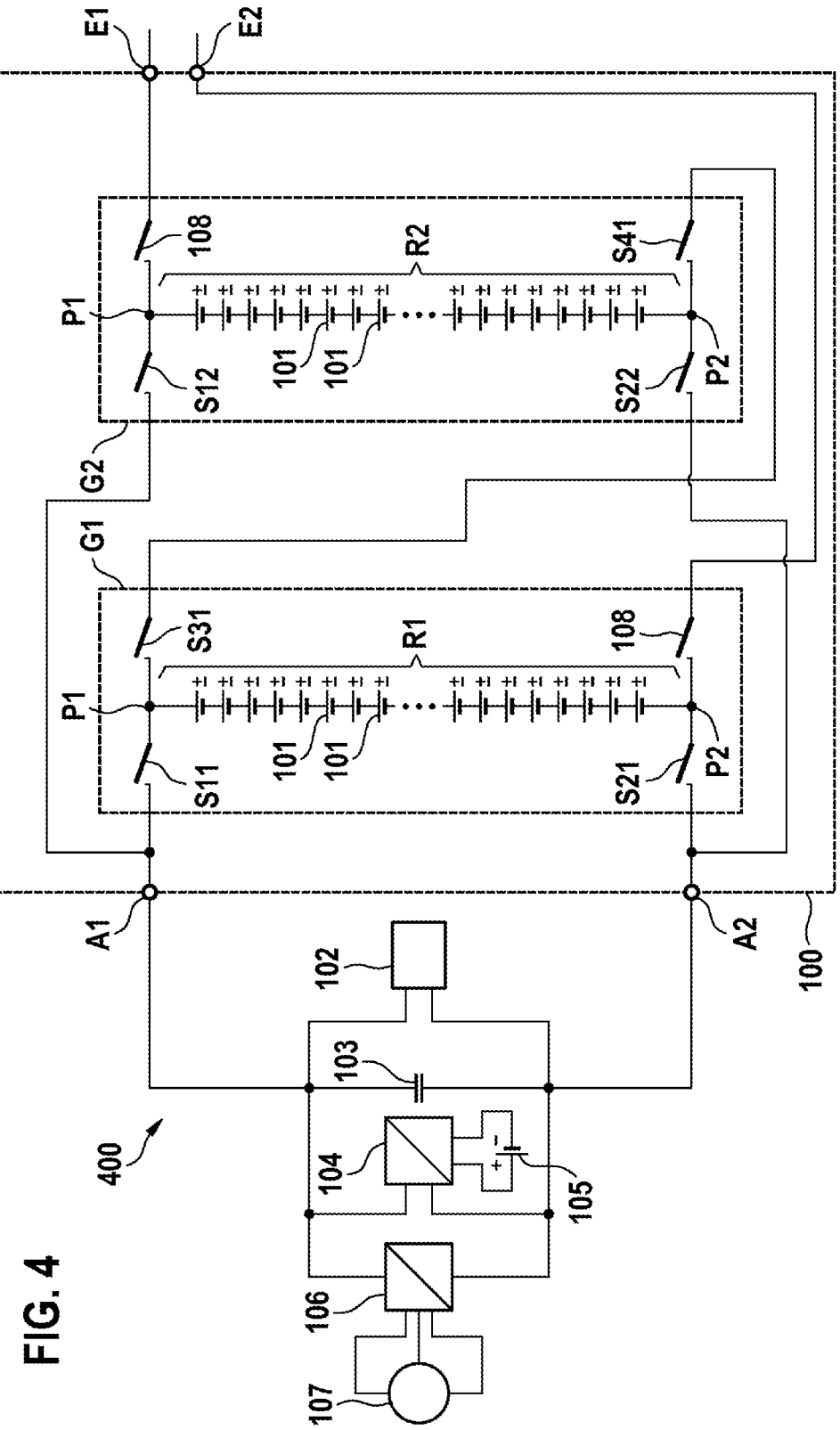

FIG. 4 shows a charging circuit 400 according to the invention for a vehicle with two electrical energy storage units R1 and R2 according to a third embodiment. In particular, by means of a first fourth switch S41 a spatially separated layout of the electrical energy storage units R1 and R2 is possible, which nevertheless allows a possible safety requirement according to all-pole isolation of the high-voltage components, for example for the purpose of protection against external contact. The electrical energy storage units R1 and R2 together with the associated switches are installed in separate housings G1 and G2, which in particular allows flexibility to be gained in terms of the configuration of the installation space. To charge or to start the charging operation with an increased charging voltage, it is also necessary to close the first fourth switch S41 in addition to the first third switch S31, so that a series connection of the electrical energy storage units R1 and R2 is produced. On completion of the charging operation therefore, in addition to opening the first third switch S31, the first fourth switch S41 must also be opened. In addition, it is advantageous that the components located in the separate housings G1 and G2 are the same in each case, in other words the battery 100 can be constructed from identical modules or sub-systems, which saves manufacturing costs and simplifies a possible replacement in case of repair.

Figure 5:
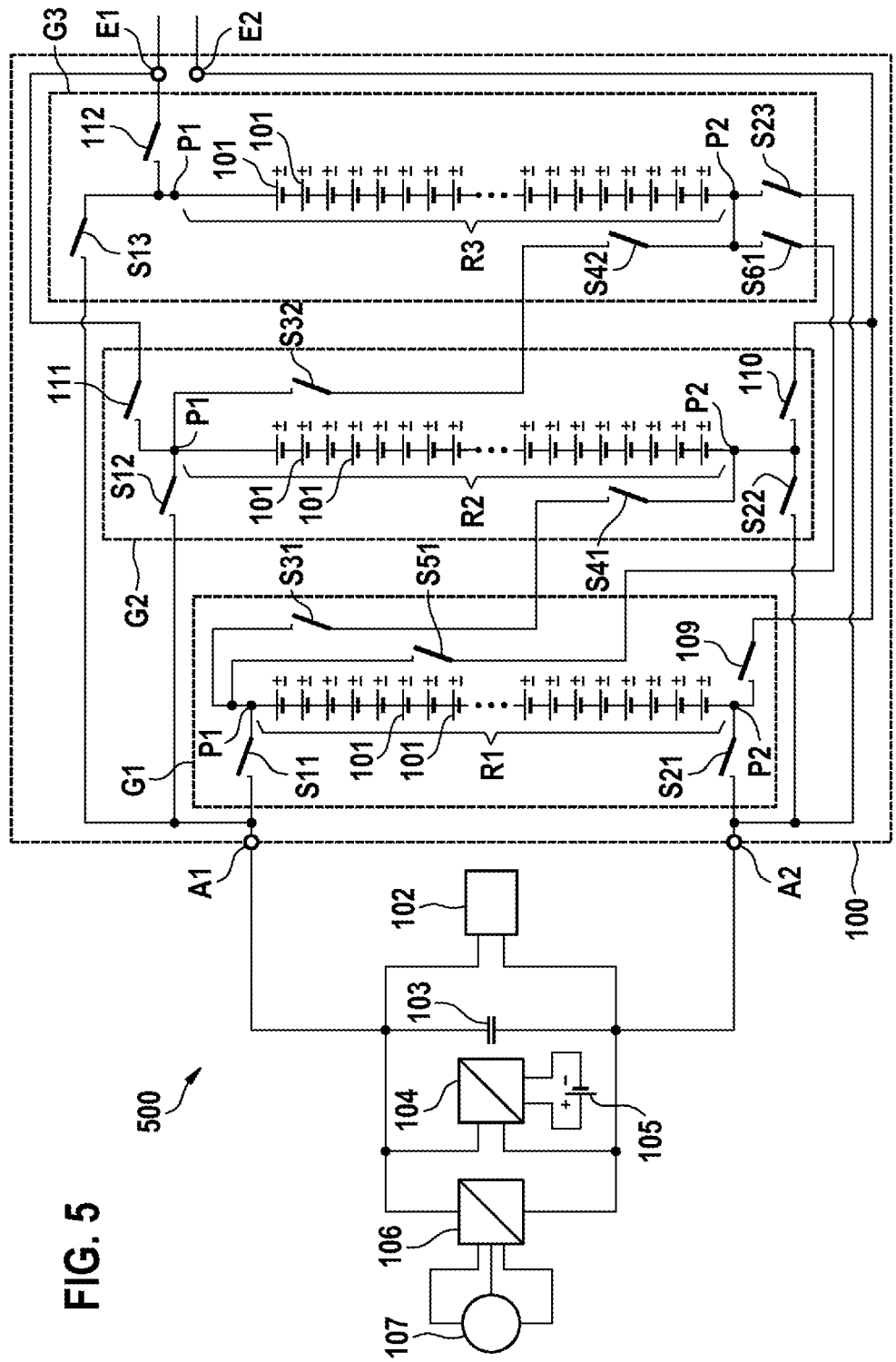

FIG. 5 shows a charging circuit 500 according to the invention for a vehicle with three electrical energy storage units R1, R2 and R3 according to a fifth embodiment. In addition to the third switches S31 and S32 and the fourth switches S41 and S42, the charging circuit is provided with a fifth switch S51 and a sixth switch S61, which allow the first electrical energy storage unit R1 to be connected in series with the third electrical energy storage unit R3, so that it is possible to connect any two electrical energy storage units in series. Switches 109, 110, 111 and 112 are intended in particular for preventing impermissibly high voltages on the electrical energy storage units R1, R2 and R3 during the charging operation, and/or to ensure the all-pole disconnection of the potential of the electrical energy storage units, in particular for external connections on the housings G1, G2 and G3. The possible switch positions in the charging mode obtained for a series connection of any two arbitrary energy storage units are as follows:

|  | S11 | S12 | S21 | S22 | S31 | S41 | S51 | S61 | S13 | S23 | S32 | S42 | 109 | 110 | 111 | 112 |
|---|---|---|---|---|---|---|---|---|---|---|---|---|---|---|---|---|
| R1 + R2 | x/o | o/x | x/o | o/x | x | x | o | o | x/o | x/o | o | o | x | o | x | o |
| R1 + R3 | x/o | x/o | x/o | x/o | o | o | x | x | o/x | o/x | o | o | x | o | o | x |
| R2 + R3 | x/o | x/o | x/o | x/o | o | o | o | o | o/x | o/x | x | x | o | x | o | x |

In the table, "x" denotes a closed switch position and "o" an open switch position. "x/o" indicates that both a closed and an open switch position are possible. For example, in the charging operation in the series connection of the electrical energy storage units R1 and R2, an electrical component connected via the first output A1 and the second output A2 can be supplied with power both via the first electrical energy storage unit R1 and the second electrical energy storage unit R2, as well as the third electrical energy storage unit R3. The same applies to the other possibilities of the series connections of two electrical energy storage units.

Figure 6:
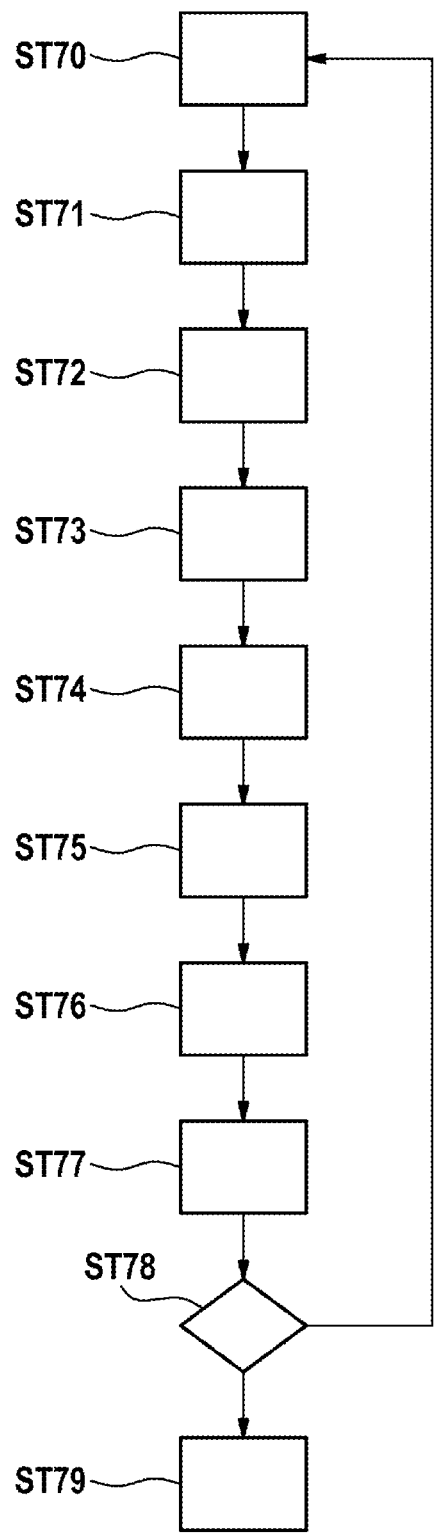

FIG. 6 shows a flow chart of a method according to the invention for an electrical energy storage system with three electrical energy storage units R1, R2 and R3, in accordance with an exemplary embodiment. The initial position of all switches for the following exemplary description is that all switches are open. In a first step ST70, two of the three electrical energy storage units are selected, for example, the electrical energy storage units R1 and R2, which are to be charged in the charging operation by means of an energy source connected to the first input E1 and the second input E2. In addition, it is determined whether an electrical component connected to the first output A1 and to the second output A2 is to be supplied by at least one electrical energy storage unit in the charging operation. For example, the electrical component here is supplied by the third electrical energy storage unit R3. In a second step ST71, the first switches S11 and S12 as well as the second switches S21 and S22 are opened, or left in the open position. The third second switch S23 and the third first switch S13 are closed in order to ensure the supply of the electrical component by the third electrical energy storage unit R3. To achieve this, a precharging of an intermediate circuit with intermediate circuit capacitance 103 may take place after the third second switch S23 is closed and before the third first switch S13 is closed. Then, in a third step ST72 the first third switch S31 is closed. In a fourth step ST73, the first fourth switch S41 is closed. At this point a series connection of the electrical energy storage units R1 and R2 is obtained. In a fifth step ST74 for a series interconnection of the electrical energy storage units R1 and R2 no action takes place, because no fifth or sixth switches need to be closed in order to produce a series interconnection of the electrical energy storage units R1 and R2. In a sixth step ST75, the switch 109 and the switch 111 are closed, and the energy supply to the connected electrical energy storage units R1 and R2 is started by means of an energy source connected to the first input E1 and the second input E2. In a seventh step ST76, all charge states of the electrical energy storage units R1, R2 and R3 are monitored and compared with each other. If a required charge state for each of the electrical energy storage units R1, R2 and R3 has been reached or the charging has continued for a defined period of time, in an eighth step ST77 the energy supply to the DC energy source connected to the first input E1 and the second input E2 is switched off. In a ninth step ST78 the switches that connect the charged electrical energy storage units in series are then opened, in this case these being the first third switch S31 and the first fourth switch S41, and the switches 109 and 111. The charging operation is thus terminated and in a tenth step ST79 the electrical energy storage units R1, R2 and R3 are connected in parallel by closing the first switches S11, S12 and S13 and the second switches S21, S22 and S23. Where appropriate, upon exceeding a defined charge state difference between any two electrical energy storage units, in this case between the electrical energy storage units R1 and R3 or R2 and R3, at least one electrical energy storage unit to be charged is exchanged, for example in a cyclical manner, to enable a uniform charging of all electrical energy storage units. Another criterion that can also be used is a defined charging period. The method then starts again at the first step ST70, wherein the switch positions are adjusted in accordance with the foregoing comments. The electrical energy storage units to be charged are now the electrical energy storage units R1 and R3. The execution of the method is continued mutatis mutandis with respect to the sequence described above, until the required charge states for the electrical energy storage units R1, R2 and R3 are reached. When changing over or switching between the electrical energy storage units supplying the electrical components of the vehicle, it is advantageous to signal to the electrical components, for example the air-conditioning compressor 102, before opening the corresponding switches, for example, the third first switch S13 and the third second switch S23, to minimize their consumption. This enables a sharp decrease in the voltage in the intermediate circuit to be avoided. In addition, it is also possible to provide a further step in which all electrical energy storage units are connected in parallel, and wherein the charging takes place with reduced charging power. This step may, for example, directly follow the step ST79.

Figure 7:
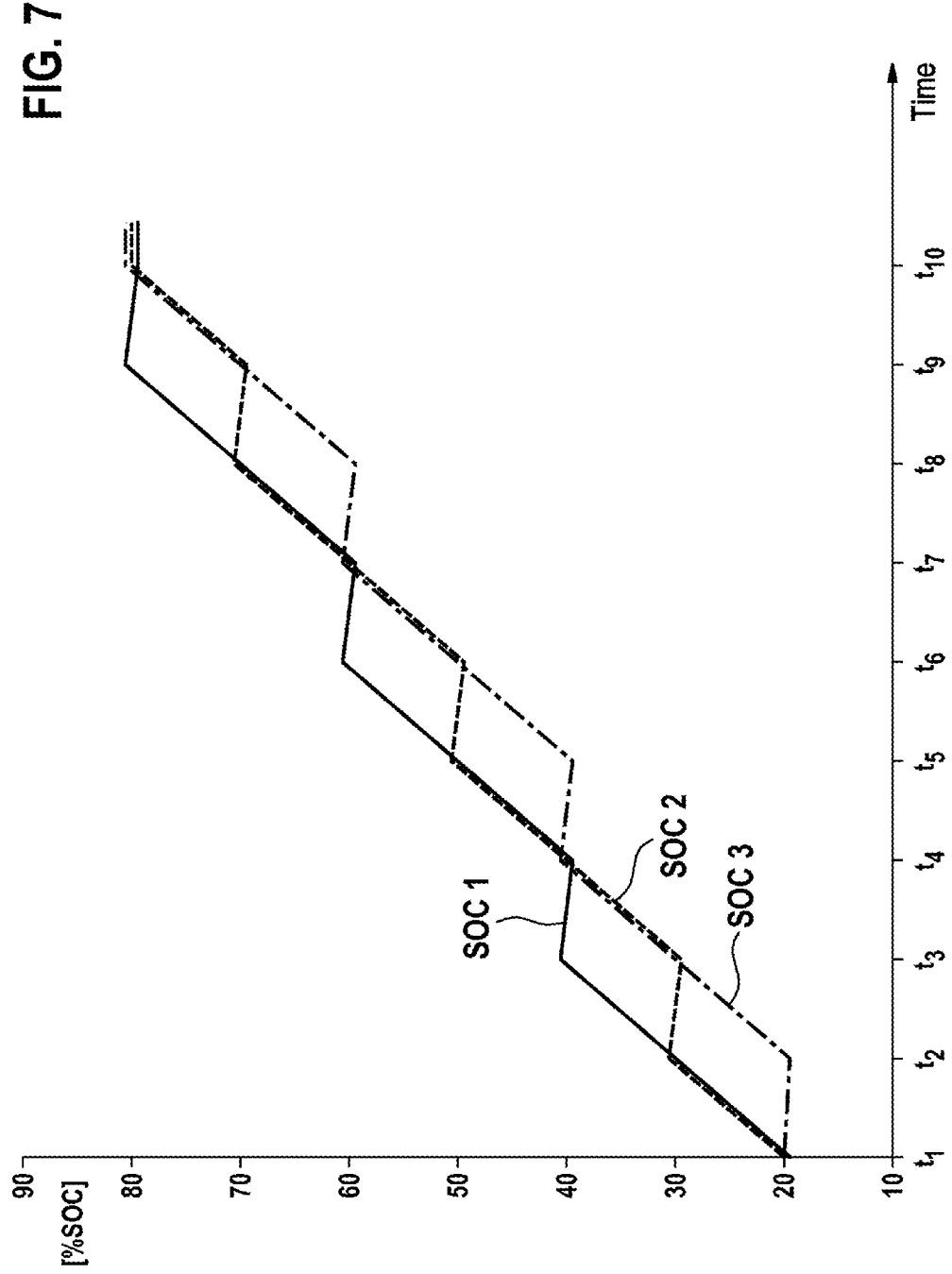

FIG. 7 shows a time curve of the charge state when the charging method according to the invention is used for the electrical energy storage system with the three electrical energy storage units R1, R2 and R3, in accordance with the exemplary embodiment. Charging of the electrical energy storage units R1 and R2 starts at a time point $t_1$, wherein the electrical energy storage unit R3 now supplies the electrical components connected via the first output A1 and the second output A2 with energy, which is manifested in particular in a falling state of charge SOC3 of the third electrical energy storage unit R3. From a time $t_2$ the charging of the first electrical energy storage unit R1 and of the third electrical energy storage unit R3 takes place, wherein the second electrical energy storage unit R2 now supplies electrical components connected via the first output A1 and the second output A2 with energy, which is manifested in particular in a falling state of charge SOC2 of the second electrical energy storage unit R2. From a time $t_3$ the charging of the second electrical energy storage unit R2 and the third electrical energy storage unit R3 takes place, wherein the first electrical energy storage unit R1 now supplies the electrical components connected via the first output A1 and the second output A2 with energy, which is manifested in particular in a falling state of charge SOC1 of the third electrical energy storage unit R1. From a time $t_4$, the method and hence the charge state curve continues, mutatis mutandis, until at a time $t_{10}$ a required charge state for each of the three electrical energy storage units R1, R2 and R3 is reached. This is followed by a charge state balancing phase as soon as all three electrical energy storage units R1, R2 and R3 are connected in parallel, in order to supply the electrical component via the first output A1 and the second output A2.

Figure 8:
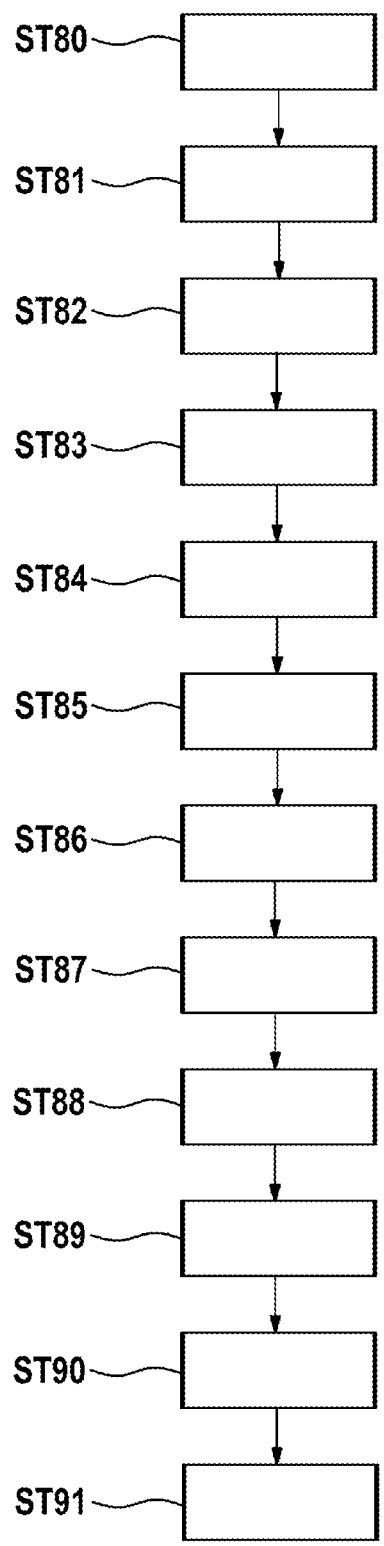

FIG. 8 shows a flow diagram of the method according to the invention in accordance with a second embodiment of an electrical energy storage system with two electrical energy storage units R1, R2, an example of which is shown in FIG. 4. The initial position of all switches for the following exemplary description is that all switches are open. A first step ST80 essentially corresponds to the first step ST70 from the previous embodiment, a second step ST81 essentially corresponds to the second step ST71, a third step ST82 essentially to the third step ST72 and a fourth step ST83 essentially to the fourth step ST73. These are summarized briefly below. In the first step ST80, the two electrical energy storage units R1, R2 are selected for charging by means of an energy source connected to the first input E1 and to the second input E2. In addition, it is determined whether an electrical component connected to the first output A1 and the second output A2 is to be supplied with electrical energy by at least one electrical energy storage unit in the charging operation. For example, the electrical component is to be supplied by the second electrical energy storage unit R2. To this end, in a second step ST81 the second first switch S12 and the second second switch S22 are closed and the first first switch S11 and the first second switch S21 are left in the open position. Then, in the third step ST82 the first third switch S31 is closed. In the following fourth step ST83, the first fourth switch S41 is closed. At this point a series connection of the electrical energy storage units R1, R2 is obtained. In a fifth step ST84, the switches 108 are closed and the energy supply to the electrical energy storage units R1, R2 is started by means of an electrical energy source connected to the first input E1 and the second input E2 in order to charge the electrical energy storage units R1, R2. In a sixth step ST85, the charge states of the electrical energy storage units R1, R2 are monitored during the charging and compared with each other. If a required charge state, for example 90%, for each of the electrical energy storage units R1, R2 is reached, or a predefined charging period is reached, in a seventh step ST86 the energy supply to the electrical energy source is switched off, wherein the switches 108 are additionally re-opened. In an eighth step ST87 the switches that electrically connect the charged electrical energy storage units in series are then opened, in this case these being the first third switch S31 and the first fourth switch S41. Then in a ninth step ST88, a comparison of the charge states of the two electrical energy storage units R1, R2 is made. Under the assumption that the electrical energy storage unit R1 has a higher state of charge than the electrical energy storage unit R2 and the pre-defined charge state difference between the electrical energy storage units R1, R2 is exceeded, in a tenth step ST89 an electrical connection between the electrical energy storage unit R1 and the first output A1 and the second output A2 is made, for which purpose the first first switch S11 and the first second switch S21 are closed. At the same time, the electrical connection between the electrical energy storage unit R2 and the first output A1 and the second output A2 is interrupted by opening the second first switch S12 and the second second switch S22. Thus, in an eleventh step ST90 the electrical component is supplied with electrical energy from the electrical energy storage unit R1 with the highest state of charge, until the charge state of the electrical energy storage unit R1 has aligned itself with the charge state of the electrical energy storage unit R2, for example except for the predefined charge state difference. Then, in a twelfth step ST91, the second first switch S12 and the second second switch S22 are closed. Thus, the electrical energy storage units R1, R2 are again connected in parallel and jointly supply the electrical component at the output.

What is claimed is:

1. A charging circuit (200, 300, 400, 500) for an electrical energy storage system (100) with n electrical energy storage units (R1, R2, R3) each having a first pole and a second pole, the charging circuit comprising
   at least one first input (E1) and one second input (E2) for electrically connecting to an energy source,
   at least one first output (A1) and one second output (A2) for electrically connecting to an electrical component,
   at least n first pole connections (P1) and n second pole connections (P2), wherein an i-th first pole connection (P1) and an i-th second pole connection (P2) can be connected in an electrically conductive manner to the first pole of the i-th electrical energy storage unit (R1, R2, R3) and to the second pole of the i-th electrical energy storage unit (R1, R2, R3) respectively,
   at least n first switches (S11, S12, S13), wherein a first connection of the i-th first switch (S11, S12, S13) is connected in an electrically conductive manner to the i-th first pole connection (P1) of the i-th electrical energy storage unit (R1, R2, R3),
   at least n second switches (S21, S22, S23), wherein a first connection of the i-th second switch (S21, S22, S23) is connected in an electrically conductive manner to the i-th second pole connection of the i-th electrical energy storage unit (R1, R2, R3), and
at least n-1 third switches (S31, S32), wherein a first connection of the k-th third switch (S31, S32) is connected in an electrically conductive manner to the first pole connection of the k-th electrical energy storage unit (R1, R2, R3) and a second connection of the k-th third switch (S31, S32) is connected in an electrically conductive manner to the second pole connection of the k+1-th electrical energy storage unit (R1, R2, R3), where n >1 and i<=n, and k<n are natural numbers,
   characterized in that the first output (A1) is connected in an electrically conductive manner to the second connection of the first switch (S11), the second output (A2) is connected in an electrically conductive manner to the second connection of the first second switch (S21), the first input (E1) is connected in an electrically conductive manner to the first connection of an nth first switch (S12, S13), the second input (E2) is connected in an electrically conductive manner to the first connection of the first second switch (S21), and the first (S11, S12, S13), second (S211, S22, S23) and third (S31, S32) switches are connected in such a way that, by means of an energy source connected to the first input (E1) and the second input (E2), a voltage level at least twice as high as the voltage level between the first output (A1) and the second output (A2) is applied between the first input (E1) and the second input (E2) during a charging operation.

2. The charging circuit (200, 300, 400, 500) as claimed in claim 1, characterized in that the second connection of the i-th second switch (S21, S22, S23) is connected in an electrically conductive manner to the second output (A2)

and the second connection of the i-th first switch (S11, S12, S13) is connected in an electrically conductive manner to the first output (A1).

3. The charging circuit (200, 300, 400, 500) as claimed in claim 1, characterized in that the charging circuit (200, 300, 400, 500) comprises at least n-1 fourth switches (S41, S42) and the k-th fourth switch (S41, S42) is inserted into the electrical connection between the second connection of the k-th third switch (S31, S32) and the second pole connection (P2) of the k+1-th electrical energy storage unit (R2, R3), wherein the second connection of the k-th third switch (S31, S32) is connected in an electrically conductive manner to a first connection of the k-th fourth switch (S41, S42) and a second connection of the k-th fourth switch is connected in an electrically conductive manner to the second pole connection (P2) of the k+1-th electrical energy storage unit (R2, R3).

4. The charging circuit (200, 300, 400, 500) as claimed in claim 1, characterized in that for each two-element subset of the n-element set of the electrical energy storage units (R1, R2, R3), which does not consist of neighboring elements, the charging circuit (200, 300, 400, 500) comprises at least one fifth switch (S51) and at least one sixth switch (S61), wherein a first connection of the respective fifth switch (S51) and a second connection of the respective fifth switch (S51) are connected in an electrically conductive manner to the first pole connection (P1) of the respective first electrical energy storage unit (R1) and to a first connection of the respective sixth switch (S61) respectively, and wherein a second connection of the respective sixth switch (S61) is connected in an electrically conductive manner to the second pole connection (P2) of the respective second electrical energy storage unit (R3).

5. The charging circuit (200, 300, 400, 500) as claimed in claim 1, characterized in that an inductive component (201) is connected in an electrically conductive manner in series with at least one first switch (S11, S12, S13) and/or at least one second switch (S21, S22, S23).

6. A charging method for the charging operation of an electrical energy storage system (100) with n electrical energy storage units (R1, R2, R3), where n>1 applies, and with at least one charging circuit (200, 300, 400, 500) as claimed in claim 1, the charging method comprising the following steps:
 a) selecting at least two of the n electrical energy storage units (R1, R2, R3) to be charged by means of an energy source connected to the first input (E1) and the second input (E2) in a charging operation, and deciding whether an electrical component connected to the first output (A1) and the second output (A2) should be supplied during the charging of at least one electrical energy storage unit (R1, R2, R3) (ST70),
 b) opening the first switches (S11, S12, S13) and the second switches (S21, S22, S23) of the electrical energy storage units to be charged (R1, R2, R3), wherein depending on the decision in step a) those first switches (S11, S12, S13) and those second switches (S21, S22, S23) which belong to the at least one electrical energy storage unit (R1, R2, R3) supplying the electrical component are closed (ST71),
 c) closing those third switches (S31, S32), which connect the electrical energy storage units to be charged in series (ST72), and
 d) starting the supply of energy by means of an energy source (ST75) connected to the first and second input.

7. The charging method as claimed in claim 6, further comprising the following step:

a) closing the fourth switches (S41, S42) that are connected in an electrically conductive manner to the third switches (S31, S32) that connect the electrical energy storage units (R1, R2, R3) to be charged in series in an electrically conductive manner (ST73).

8. The charging method as claimed in claim 6, further comprising the following step:
 a) closing the fifth switches (S51) and sixth switches (S61) that connect in series the electrical energy storage units (R1, R2, R3) to be charged (ST74).

9. The charging method as claimed in claim 6, further comprising the following steps:
 a) switching off the energy supply (ST77),
 b) opening the switches which connect the charged electrical energy storage units (R1, R2, R3) in series (ST78), and
 c) closing the first switches (S11, S12, S13) and the second switches (521, S22, S23) of the charged electrical energy storage units (R1, R2, R3) (ST79).

10. The charging method as claimed in claim 9, further comprising the following steps after step h):
 j) comparison of the charge states of the n electrical energy storage units (R1, R2, R3);
 k) upon exceeding a predefined charge state difference between the n electrical energy storage units (R1, R2, R3), establishing an electrical connection between the electrical energy storage unit with the lowest charge state and the energy source, as well as interrupting the electrical connection between the other n-1 electrical energy storage units and the energy source by suitable activation of at least the first switches (S11, S12, S13) and the second switches (521, S22, S23);
 l) charging the electrical energy storage unit with the lowest charge state by starting the energy supply using the energy source, wherein a voltage level of the energy source is set to a voltage level prevailing between the first pole and the second pole of the electrical energy storage unit with the lowest charge state, until the charge state of the electrical energy storage unit has aligned itself to the charge states of the rest of the n-1 electrical energy storage units, at least except for the predefined charge state difference; and
 m) switching off the energy supply to the power source.

11. The charging method as claimed in claim 9, further comprising the following steps after step h) when an electrical component is supplied via the first output (A1) and the second output (A2):
 n) comparison of the charge states of the n electrical energy storage units (R1, R2, R3);
 o) upon exceeding the predefined charge state difference between the n electrical energy storage units (R1, R2, R3), establishing an electrical connection between the electrical energy storage unit with the highest charge state and the first output (A1) and the second output (A2), as well as interrupting the electrical connection between the other n-1 electrical energy storage units and the first output (A1) and/or the second output (A2) by suitable activation of at least the first switches (S11, S12, S13) and the second switches (S21, S22, S23); and
 p) supplying the electrical component with electrical energy by means of the electrical energy storage unit with the highest charge state, until the charge state of the electrical energy storage unit has aligned itself to the charge states of the rest of the n-1 electrical energy storage units, at least except for the predefined charge state difference.

12. The charging method as claimed in claim 9, characterized in that at least one switch is operated in a clocked mode for a defined period of time in step i).

13. The charging method as claimed in claim 6, characterized in that the charging states (SOC1, SOC2 SOC3) of the individual electrical energy storage units (R1, R2, R3) are monitored, and upon exceeding a defined charge state difference between any two electrical energy storage units (R1, R2, R3), an electrical component connected via the first output (A1) and the second output (A2) is supplied with energy by means of appropriate activation of at least the first (S11, S12, S13), the second (S21, S22, S23) and the third switches (S31, S32) by the electrical energy storage unit (R1, R2, R3) with the highest charge state (SOC1, SOC2 SOC3).

14. The charging method as claimed in claim 6, characterized in that the electrical energy storage units (R1, R2, R3) are uniformly charged by at least one of the electrical energy storage units to be charged (R1, R2, R3) selected in step a) being exchanged.

15. The charging method as claimed in claim 6, characterized in that depending on the decision in step a), the at least one electrical energy storage unit (R1, R2, R3) supplying the electrical component is exchanged on a cyclical basis.

16. An electrical energy storage system (100) with at least two electrical energy storage units (R1, R2, R3), characterized in that the electrical energy storage system (100) comprises a charging circuit (200, 300, 400, 500, 600) as claimed in claim 1.

17. An electrically powered vehicle comprising a charging circuit (200, 300, 400, 500) as claimed in claim 1.

* * * * *